INVENTOR.
CARL F. DRETZKE
BY Joseph G. Werner
ATTORNEY

Feb. 26, 1963
C. F. DRETZKE
3,079,016
DEVICES FOR UNLOADING MATERIALS FROM SILOS AND SIMILAR STRUCTURES
Filed March 12, 1958
12 Sheets-Sheet 5
FIG. 5
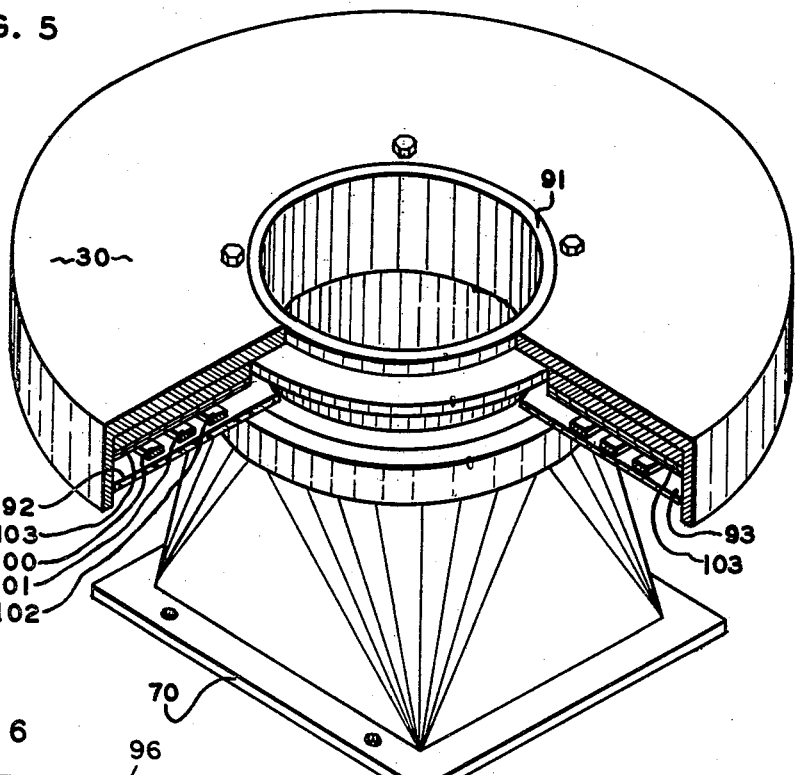
FIG. 6
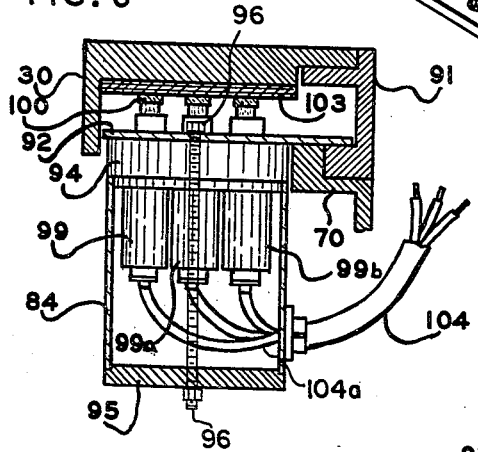
FIG. 7
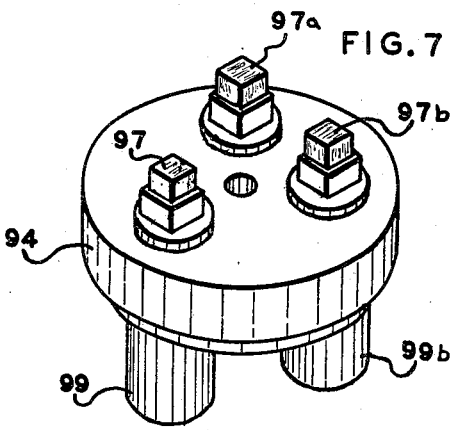
FIG. 8
FIG. 20
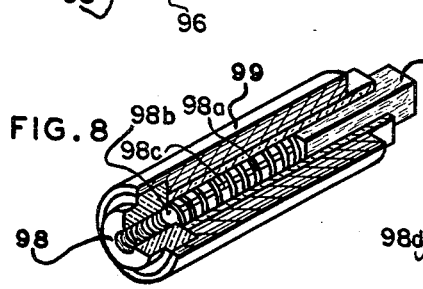
INVENTOR.
CARL F. DRETZKE
BY
*Joseph G. Werner*
ATTORNEY

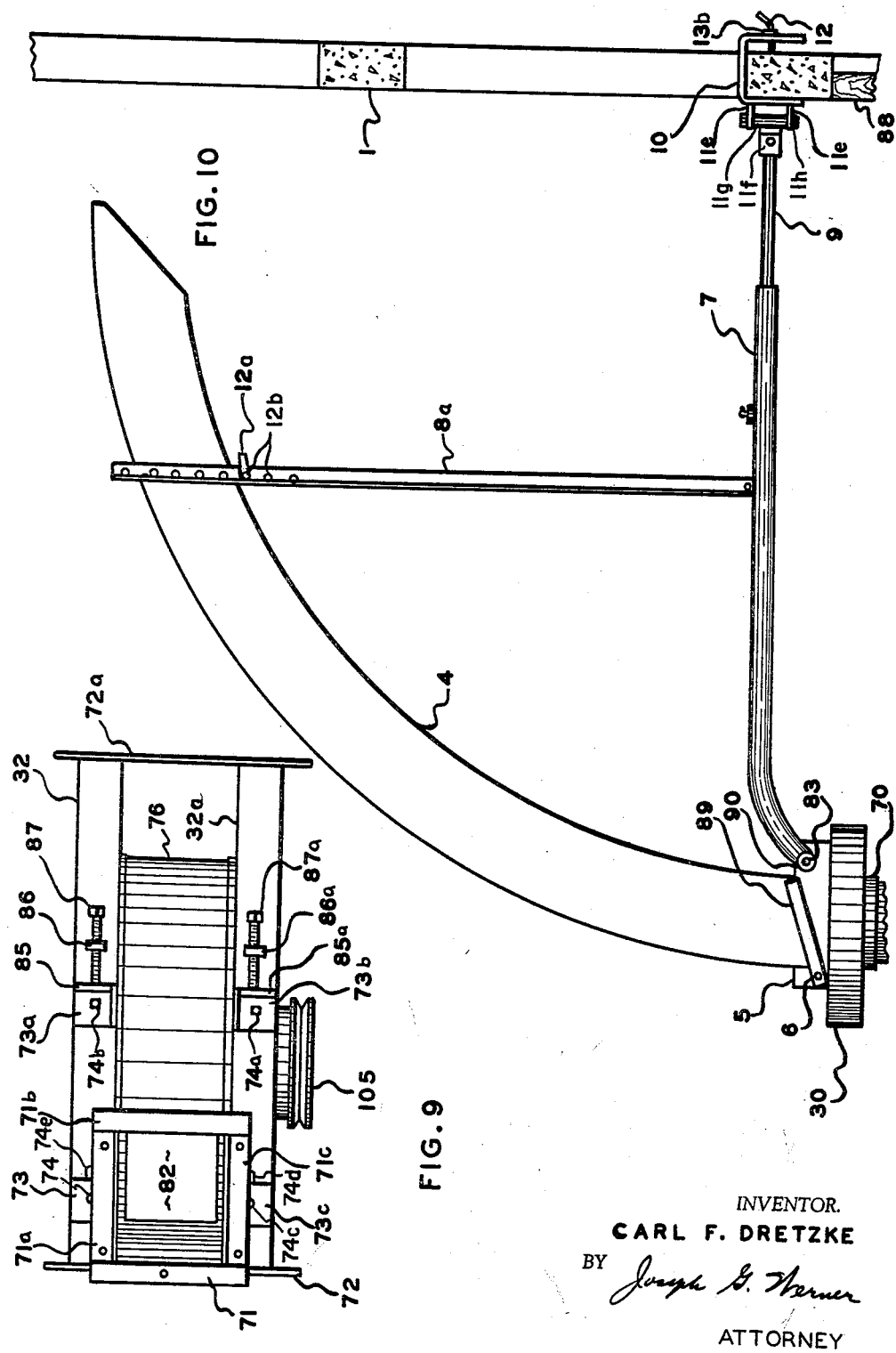

Feb. 26, 1963 C. F. DRETZKE 3,079,016
DEVICES FOR UNLOADING MATERIALS FROM SILOS
AND SIMILAR STRUCTURES
Filed March 12, 1958 12 Sheets-Sheet 7

INVENTOR.
CARL F. DRETZKE
BY
*Joseph G. Werner*
ATTORNEY

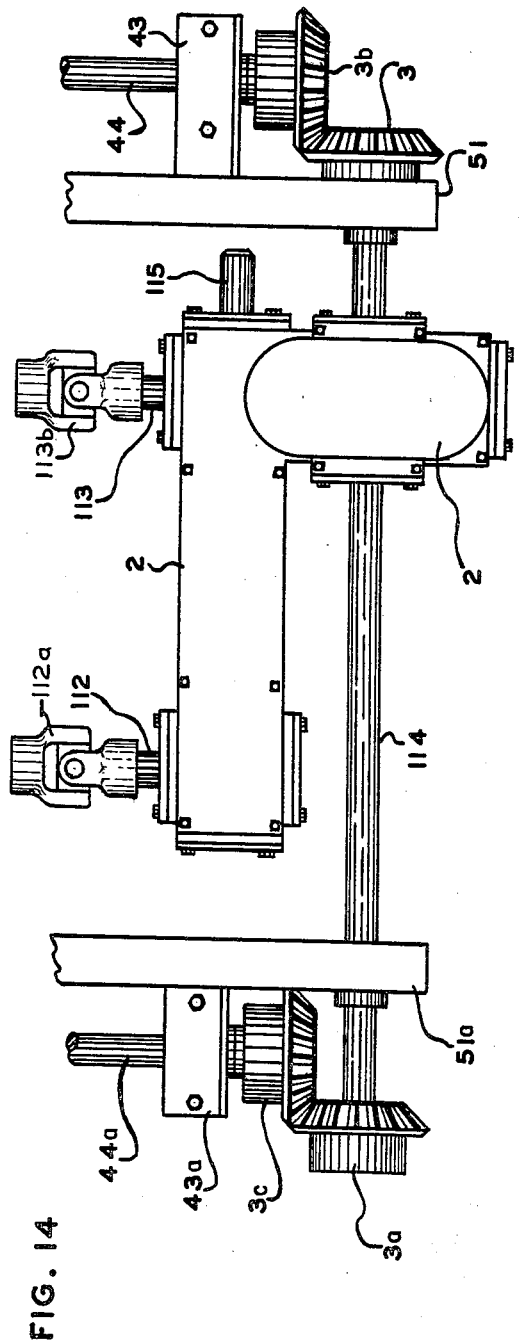
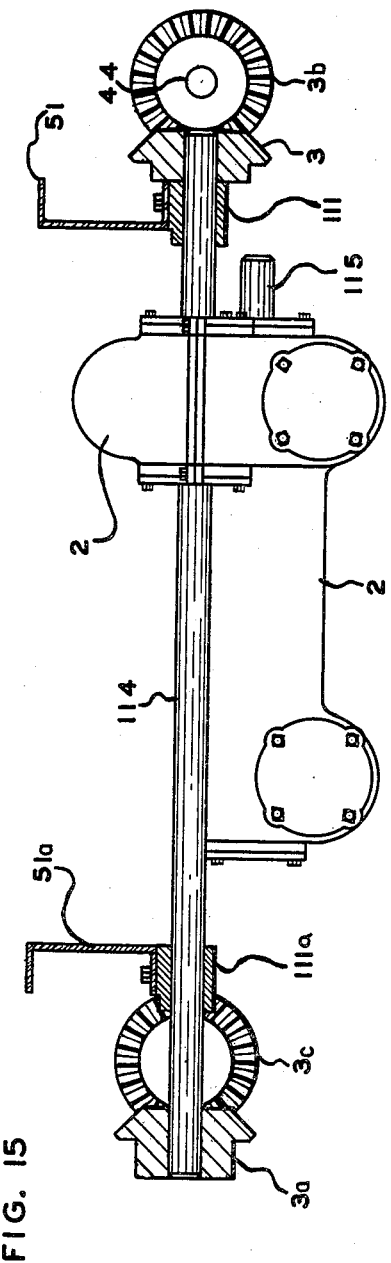
FIG. 14
FIG. 15
INVENTOR.
CARL F. DRETZKE
BY
ATTORNEY

INVENTOR.
CARL F. DRETZKE
BY Joseph G. Werner
ATTORNEY

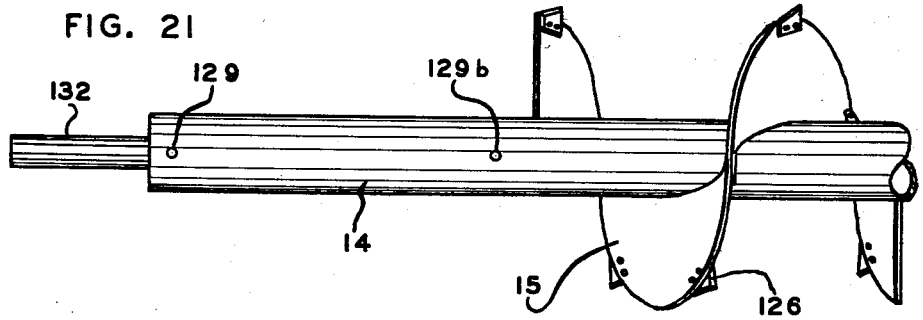
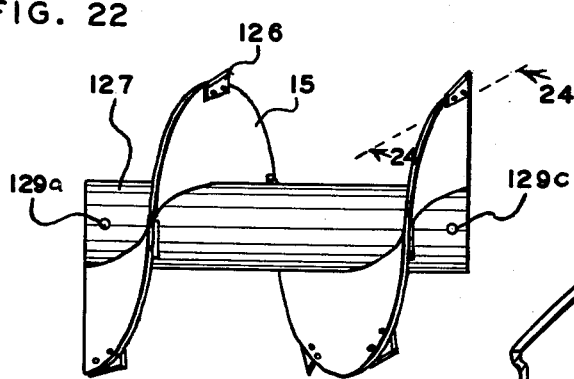
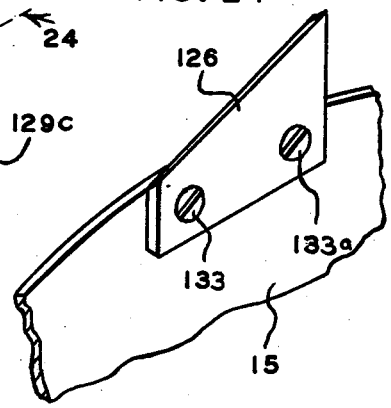
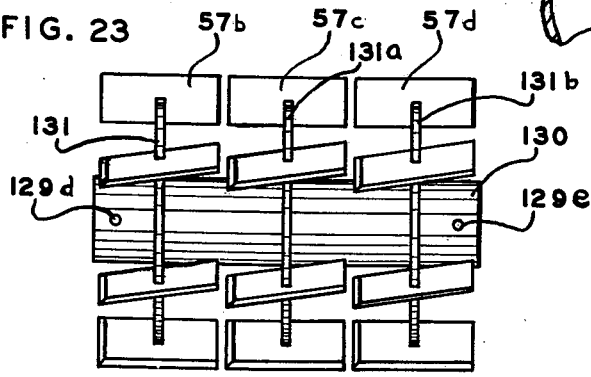

United States Patent Office 3,079,016
Patented Feb. 26, 1963

3,079,016
DEVICES FOR UNLOADING MATERIALS FROM SILOS AND SIMILAR STRUCTURES
Carl F. Dretzke, Manawa, Wis., assignor to Sperry Rand Corporation, New Holland, Pa., a corporation of Delaware
Filed Mar. 12, 1958, Ser. No. 720,848
8 Claims. (Cl. 214—17)

The present invention relates to improvements in devices for unloading materials from silos or other storage facilities, and more particularly to devices which will remove silage or like materials from the top thereof in a uniform manner without use of cables or other supports extending from the top of the storage building.

An object of the invention is to provide a device for unloading materials from a silo or other storage facilities which automatically produces and maintains a level condition of such materials and continuously unloads a uniform and substantial quantity of material from the top thereof.

Another object of the invention is to provide a device of the kind described which operates smoothly without clogging and which is in clean condition upon the termination of each use.

A further object of the invention is to provide a device of the kind described which operates effectively in extreme cold weather as well as warm and temperate climates.

An additional object of the invention is to provide a device of the kind described which has an efficient gearing system providing motivation for the various operations within a single gear box and with one motor.

A still further object of the invention is to provide a device of the kind described which is easily installed in, and adjustable for, various sizes of silos or like structures.

Other objects and advantages will be apparent from the following detailed explanation taken in conjunction with the accompanying drawings wherein a preferred embodiment of the principles of the invention has been selected for exemplification.

In the drawings:

FIG. 5 is an enlarged perspective view of the electrical collector ring partially broken away and base.

FIG. 6 is a sectional view of the electrical brush assembly.

FIG. 7 is a perspective view of the top and side of the electrical brushes and the brush mounting base.

FIG. 8 is an enlarged perspective sectional view of a brush and brush holder.

FIG. 9 is a top view of the thrower housing and belt tightener, on the line 9—9 of FIG. 2.

FIG. 10 is a side view of the thrower pipe assembly and support with the section of the wall of the silo between the silo doors.

FIG. 14 is a top view of the gear box mounted in the frame.

FIG. 15 is a rear view of the gear box mounted in the frame.

FIG. 20 is an enlarged perspective view of the connection between the brush holder and the motor.

FIG. 21 is a perspective side view of a rear portion of one of the augers with the end section removed.

FIG. 22 is a perspective side view of a removable section of the auger.

FIG. 23 is a perspective side view of a removable section containing chippers for use in place of a removable auger section.

FIG. 24 is an enlarged perspective view of auger flighting with an auger knife attached at line 24—24 of FIG. 22.

Figure 1:
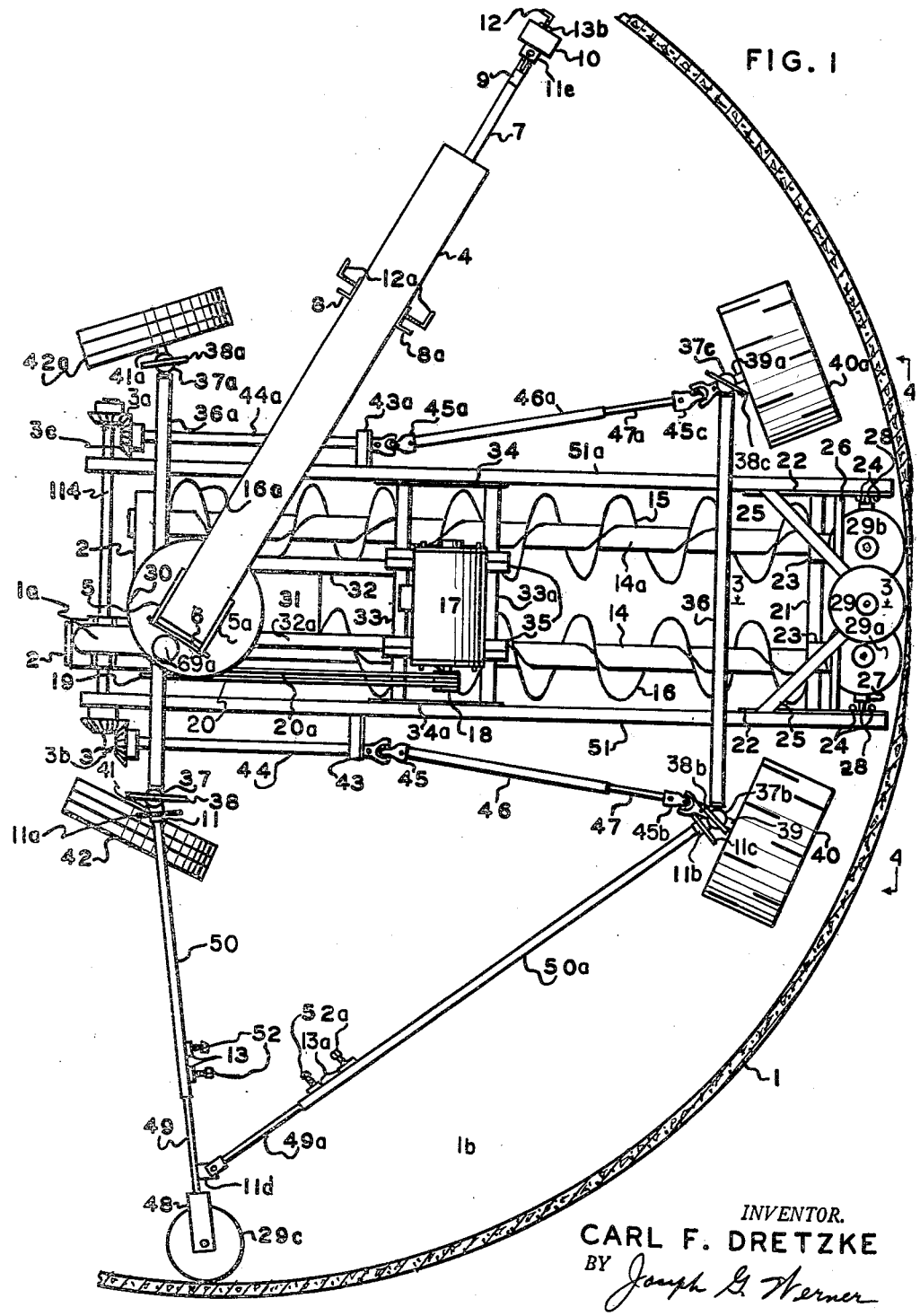
FIG. 1 is a top plane view of the unloading device within a fractional section of the silo wall.

Referring more particularly to the drawings, wherein like numerals refer to like parts, the silo unloader indicated in its entirety at 1a is positioned on silage 1b in silo 1, which silo may be of conventional construction with a discharge opening or doors at one side. Channel iron frame members 51—51a are secured to axle square tubings 36—36a by welding or other appropriate means. Motor support frame 33—33a, 34—34a is secured to frame members 51—51a by bolts or the like. The side support frame 32—32a for thrower 31 is secured to square tubing 36a and to motor support frame 33 by bolts or similar means.

Gear box 2 is likewise supported by square tubing 36a and frame members 51—51a with bearings 111 and 111a. Near the opposed ends of members 51—51a frame cross member 21 is attached by bolts or the like.

Figure 4:
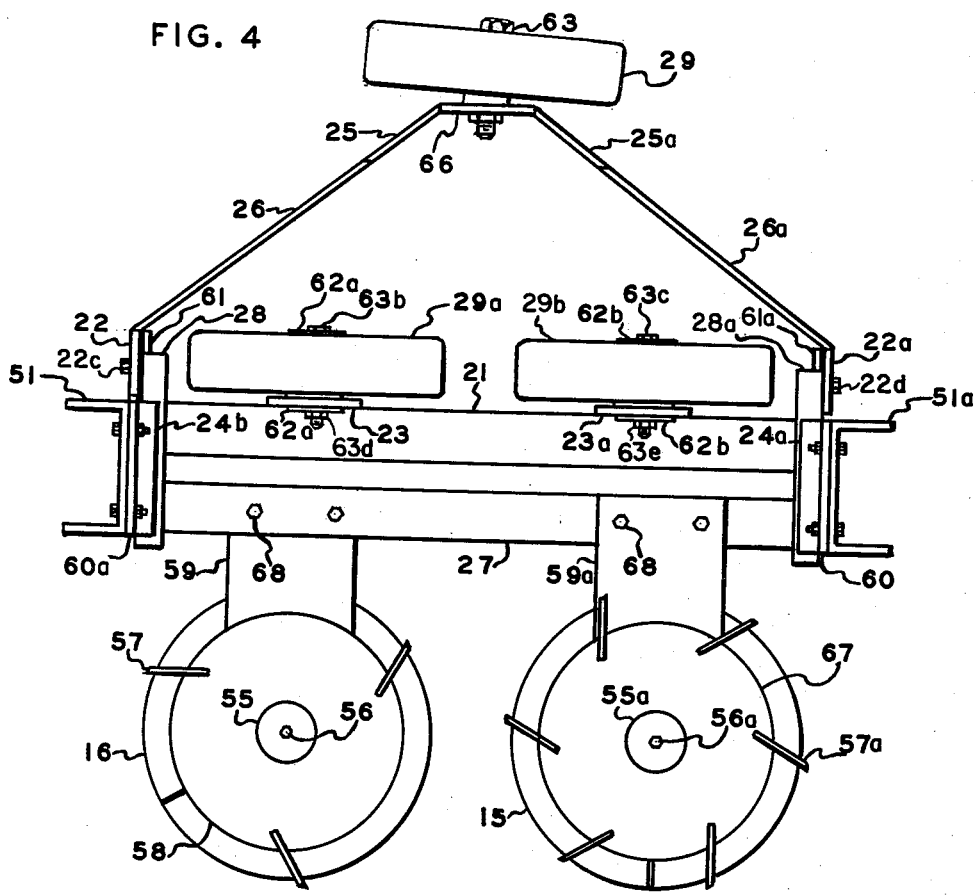
FIG. 4 is an end view of the construction of the chippers, guide wheels and automatic levelling construction taken on the line 4—4 of FIG. 1.

Extending from gear box 2 are auger shafts 112 and 113 which are respectively secured by universal joints 112a and 113b to auger pipes 14—14a, to which are welded auger flighting 15 and 16 (herein referred to as augers 15 and 16). The opposed ends of auger pipes 14 and 14a are supported by auger hangers 59 and 59a. Auger pipes 14 and 14a extend through a bearing 53 for each auger pipe and support frozen silage chippers 57 and 57a, respectively. Bearings 53 are secured to auger hangers 59 and 59a by bolts 65. Auger hangers 59 and 59a are secured by bolts 68 to yoke divider 27. In order that the chippers 57 and 57a do not follow the same path, auger hanger 59 may be secured to the rear face of the divider 27 and auger hanger 59a may be secured to the forward face of divider 27. Thus, frozen silage chipper 57a is advanced closer to the silo wall than chipper 57. The frozen silage chippers 57 and 57a are respectively secured by securely welding or bolts to discs 58 and 67 having hubs 54, which are held on chipper shaft 132 by retainer washers 55 and 55a and cap screws 56 and 56a, respectively. As shown in FIG. 4 the number of chipper blades 57 and 57a may be varied for each chipper as desired. The chipper blades are designed to throw the loosened material toward the augers to facilitate removal of the material to the thrower as hereinafter described.

Auger 15 is a left-hand auger and auger 16 is a right-hand auger and the two augers operate in opposite directions to better carry the silage to the thrower. The end of auger 15 nearest the gear box 2 has a short piece of right-hand flighting 16a to reverse the silage to direct it into the thrower 31.

Figure 3:
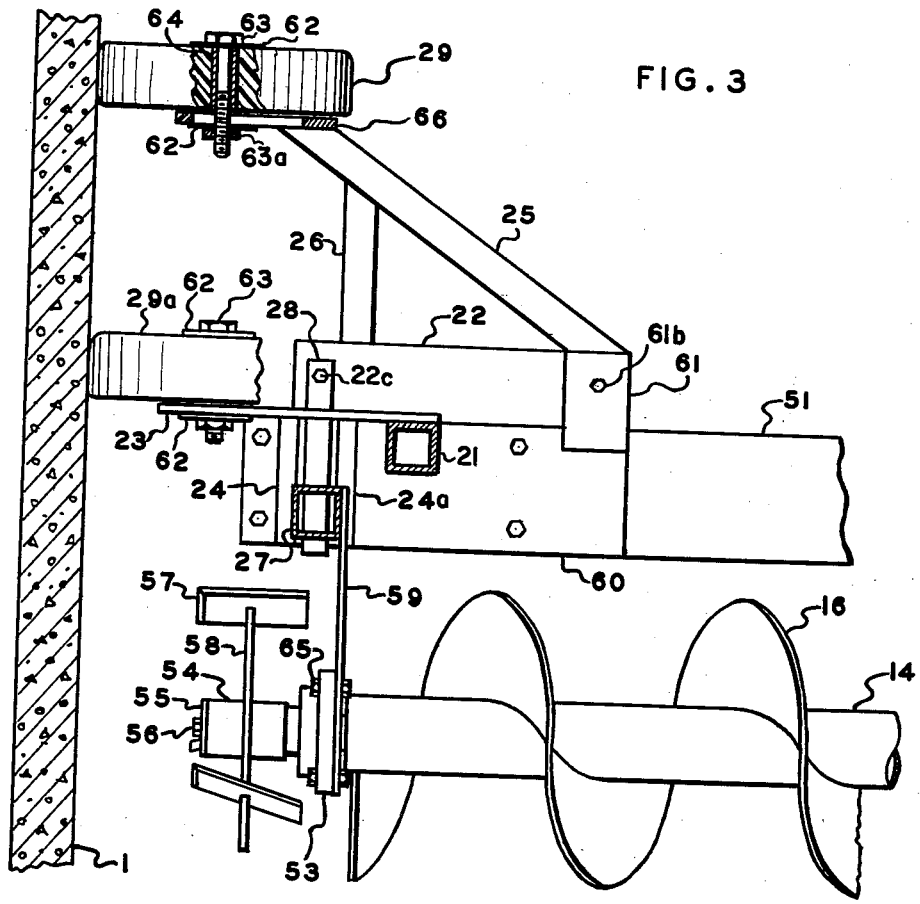
FIG. 3 is an enlarged fragmentary sectional side view of the construction at the outer end of one of the augers and chippers with guide wheel and the automatic levelling construction against the silo wall taken on the line 3—3 of FIG. 1.

Yoke risers 28 and 28a are secured to divider 27 by welding or other suitable means. Yoke risers 28 and 28a are held in position between two alignment pins 24 and 24a, which are suitably attached to mounting plates 60 and 60a on each side, which are secured to frame members 51 and 51a respectively. Yoke risers 28 and 28a are secured to lifters 22 and 22a by bolts 22c and 22d which preferably have bushings to permit movement of lifters 22 and 22a in relation to yoke risers 28 and 28a respectively. Levelling hinges 61 and 61a are respectively welded to plates 60 and 60a. Automatic leveler braces 25 and 25a are welded to lifters 22 and 22a, respectively, and gussets 26 and 26a are respectively welded to lifters 22 and 22a and leveler braces 25 and 25a. Plates 61 and 61a are secured to lifters 22 and 22a by bolts with bushings for each lifter as illustrated in FIG. 3.

Leveler braces 25 and 25a carry wheel mounting plate 66 to which guide wheel 29 is secured by washers 62, bolt 63, through bushing 64 and nut 63a. Guide wheel 29 may be tilted slightly, as shown in FIG. 4, to permit it to climb the silo wall more easily when necessary.

Lower guide wheel brackets 23 and 23a are securely attached to square divider 21 by welding or the like. Lower guide wheels 29a and 29b are respectively attached to wheel brackets 23 and 23a by washers 62a—62b, bolts 63b—63C, through bushings (not shown) and nuts 63d—63e.

Silo unloader 1a is supported by four wheels 40—40a and 42—42a which may have steel rims or rubber tires. Rubber tires have been found preferable in cold climates as there is less likelihood of rubber tires freezing to the silage. As a further precaution against slippage on hard frozen silage a steel peg wheel may be added to give better traction. Wheels 42 and 42a are placed on L-shaped wheel axle shafts 41 and 41a respectively, which are inserted into spindle holders 37 and 37a. These spindle holders are welded to the ends of axle square tubing 36a. The square tubing 36a may be raised or lowered at each such wheel by the adjusting screws 38 and 38a, which adjust the telescoping feature of spindle holders 37 and 37a over wheel axle shafts 41 and 41a, respectively.

Telescoping tubing 50 is attached in swivel manner to spindle holder 37 by holed ears 11 and pin 11a. Telescoping shaft 49 is retained within tubing 50 and may be positioned to suit various-sized silos by set screws 52 in threaded bosses 13. Wheel bracket 48 carrying guide wheel 29c is secured to telescoping shaft 49.

Drive shaft 114, is held by bearings 111 and 111a, keyed to bevel gears 3 and 3a, which are respectively geared to bevel gears 3b and 3c to motivate drive shafts 44 and 44a. Drive shafts 44 and 44a, which revolve in bearings 43 and 43a are secured to female square tubing 46 and 46a, respectively, by universal joints 45 and 45a. Male joint shafts 47 and 47a are carried by tubing 46 and 46a and attached to universal joints 45b and 45c respectively. Universal joints 45b and 45c are attached to drive shafts (not shown) that revolve in axle bearing tubing 39 and 39a, and turn drive wheels 40 and 40a respectively. Spindle holders 37b and 37c extend from the axle bearing tubing 39 and 39a with adjusting screws 38b and 38c. Axle square tubing 36 extends between spindle holders 37b and 37c.

Telescoping tubing 50a is attached in swivel manner to spindle holder 37b by holed ears 11b and pin 11c. Telescoping shaft 49a is retained within tubing 50a and may be positioned to the particular size of a silo by set screws 52a in threaded bosses 13a. Shaft 49a is attached in swivel manner to ear 11d which is welded to telescoping shaft 49.

Figure 16:
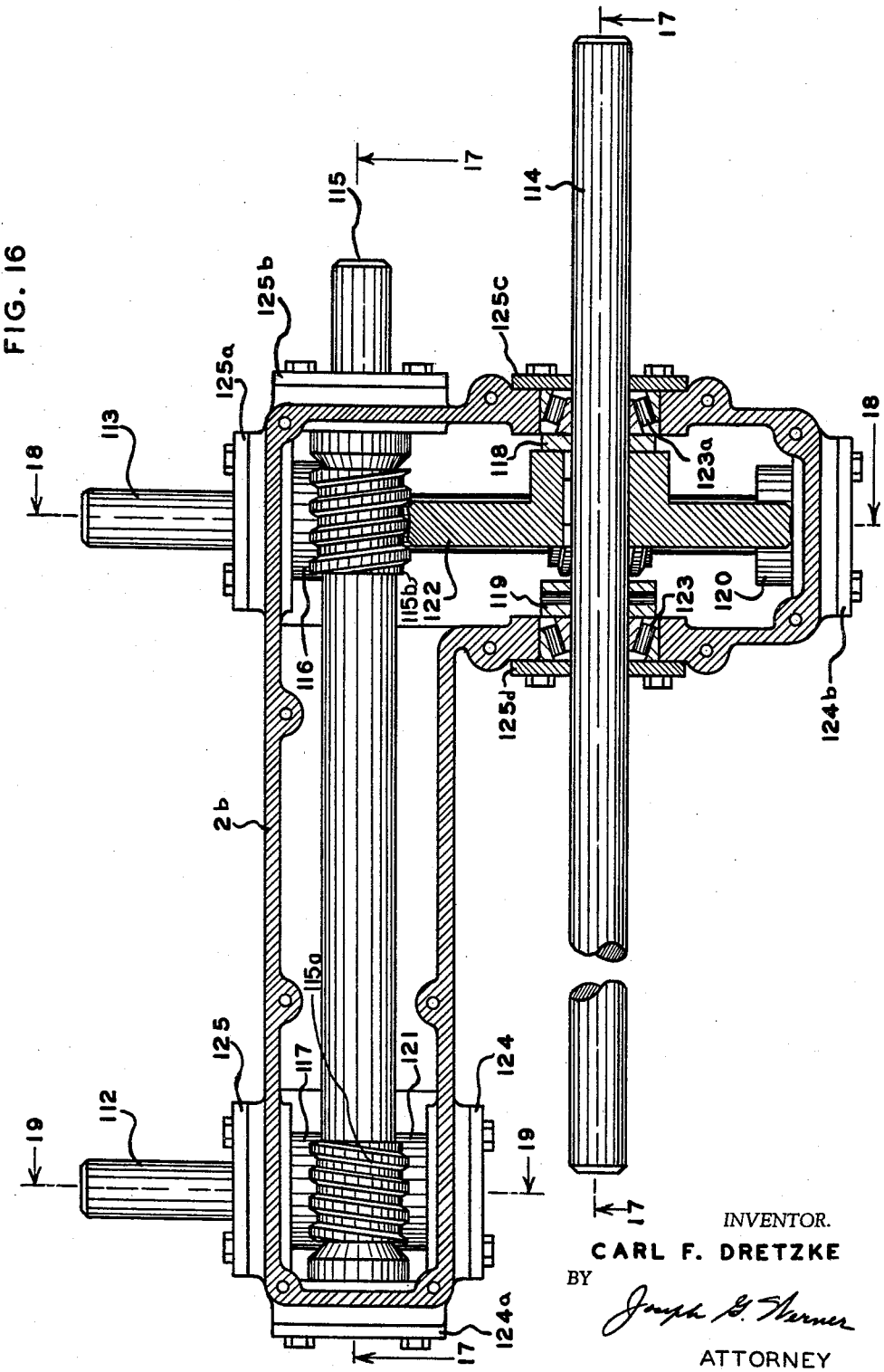
FIG. 16 is an enlarged top sectional view of the gear box.
Figure 17:
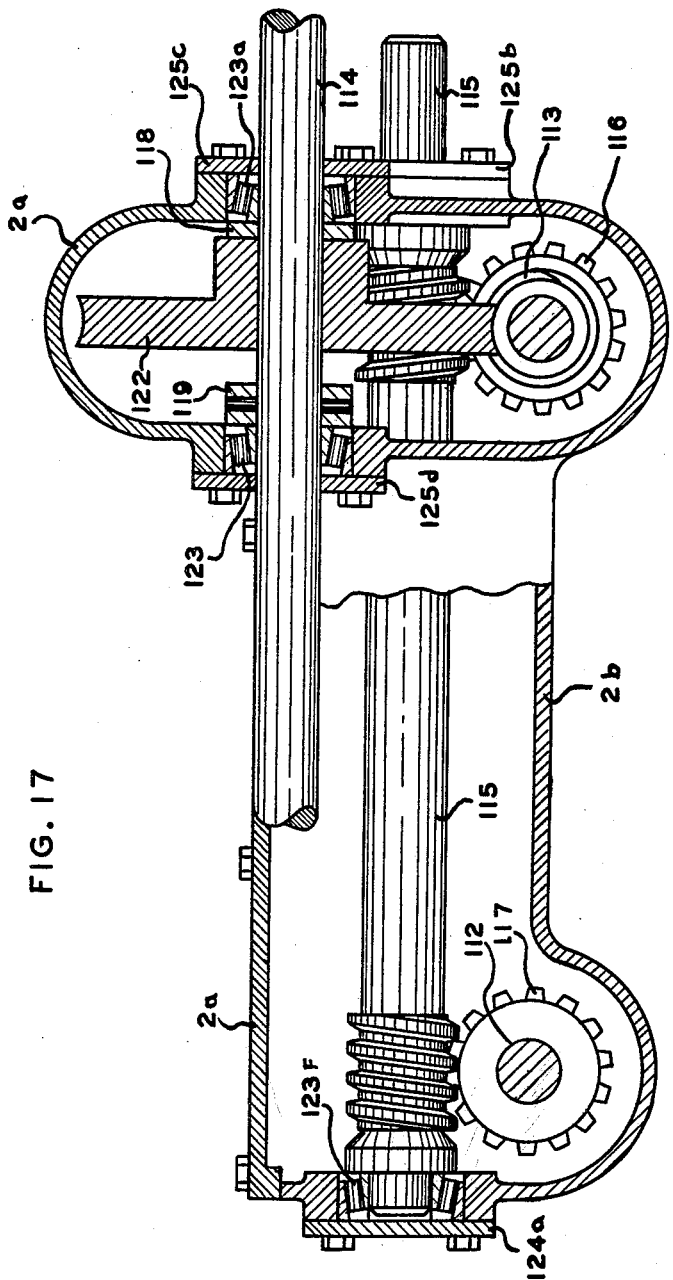
FIG. 17 is an enlarged rear sectional view of the gear box on the lines 17—17 of FIG. 16.
Figure 19:
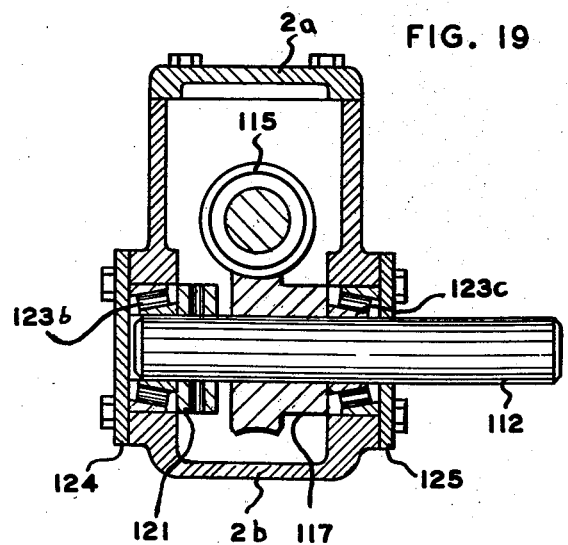
FIG. 19 is an enlarged sectional view of the gear box on the line 19—19 of FIG. 16.

Gear box housing 2b with gear box cover 2a hold the gears and shafts inside the gear box 2. As shown in FIG. 16 drive shaft 115 has a left and right worm 115a and 115b that drive worm gears 117 and 116, respectively, on auger shafts 112 and 113. Space washer 118 retains worm gear 122 in position, and collar 119 on drive shaft 114 maintains the drive shaft in proper position. Collar 121, best shown in FIG. 19, on shaft 112 acts as a spacer to retain bearing 123b in correct position. Roller bearings 123 and 123a constitute the gear box bearings for drive shaft 114, while roller bearings 123b and 123c, and 123d and 123e, are bearings for drive shafts 112 and 113 respectively. Bearing covers 124, 124a and 124b are secured to gear box housing 2b. Bearing covers 125, 125a, 125b, 125c and 125d have holes for their respective drive shafts, and are likewise secured to gear box housing 2b.

Figure 18:
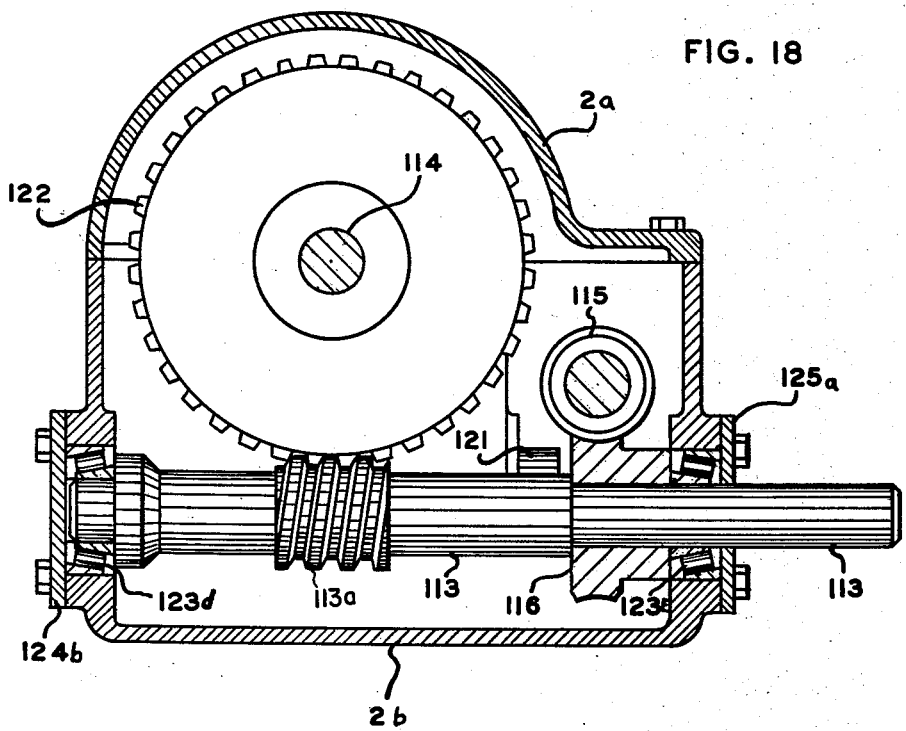
FIG. 18 is an enlarged sectional view of the worm drive gear that powers the drive wheels on the line 18—18 of FIG. 16.

As best shown in FIG. 18 auger drive shaft 113 has a worm 113a that drives worm gear 122 which is keyed to drive shaft 114.

Figure 2:
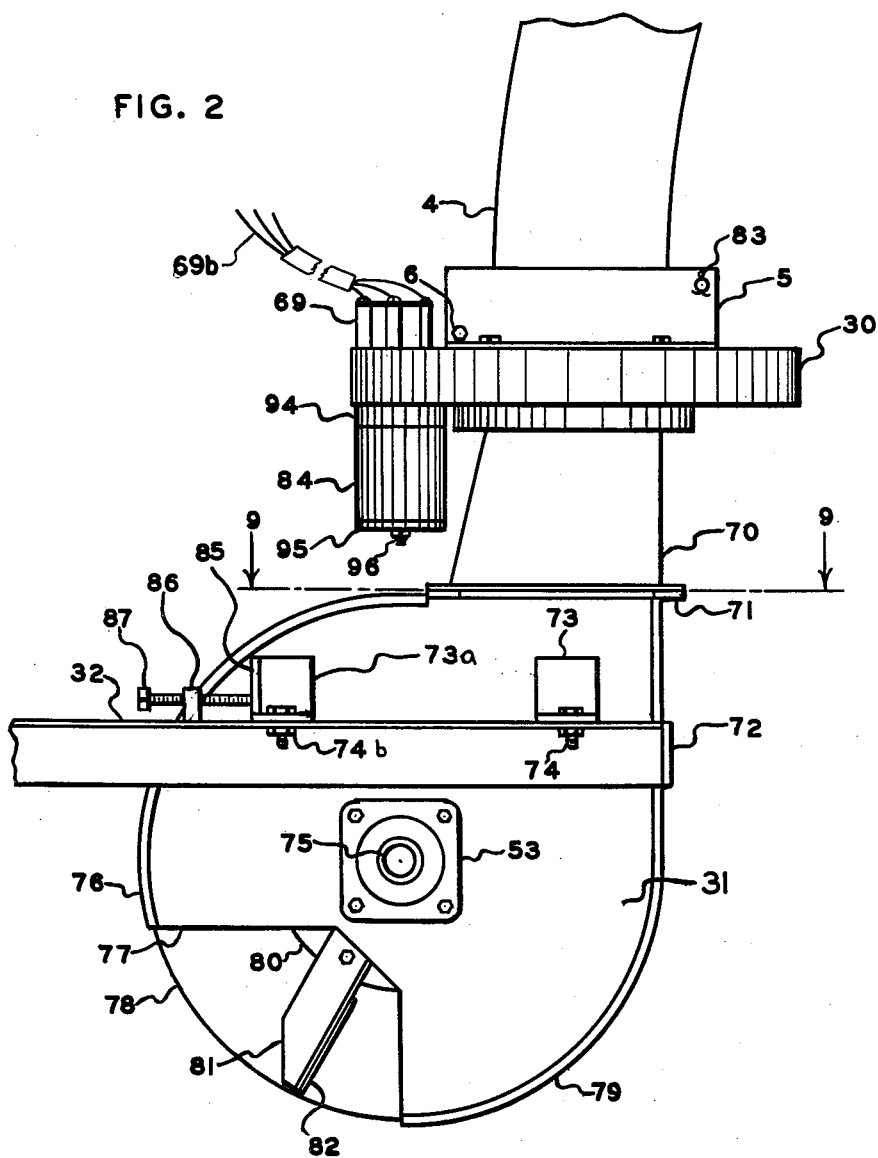
FIG. 2 is a side view of the open bottom thrower with electrical collector ring housing and electrical connecting link.

Thrower 31 preferably near the center of the silo is secured to support frames 32 and 32a by mounts 73, 73a, 73b and 73c and nuts and bolts 74, 74a, 74b, 74c as shown in FIGS. 2 and 9. Situated within the thrower walls 77 and 78 is the bracket hub 80 which is attached to thrower shaft 75 that rests in bearings 53. Bracket hub 80 carries brackets 81 to which are secured thrower blades 82. A portion of thrower wall 77 is cut away as shown in FIG. 2 to permit silage to be fed to the thrower blades from reversed flighting 16a of auger 15. The area between the outer edges of walls 77 and 78 is enclosed by outer walls 76 and 79. Bars 72 and 72a are welded to support frames 32 and 32a to provide a rigid frame to hold the thrower and the thrower belt tightener.

The belt tightener for the thrower is shown in FIGS. 2 and 9. Slotted holes 74d and 74e in support frames 32 and 32a, and similar slots under mounts 73a and 73b permit the thrower 31 to be moved back and forth on frames 32 and 32a by loosening nuts and bolts 74, 74a, 74b and 74c. In order to move the thrower 31 away from the motor 17 to tighten the belt extending between pulley 105 and motor pulley 18 tightener screws 87 and 87a are turned within adjusting nuts 86 and 86a against brackets 85 and 85a which are welded to mounts 73a and 73b. After the belt is so tightened the nuts and bolts 74, 74a, 74b and 74c are tightened to retain the belt in taut position.

The square to round housing 70 is attached to thrower housing 31 on mounting frame 71. Collector ring housing 30 is bolted to turntable 91 and is rotatably connected to square to round housing 70. Situated on collector ring housing 30 are electrical connection posts 69 which may be covered with box 69a. The wires 69b lead from the electrical switchbox (not shown) in the silo room or barn, and are connected with copper rings 100, 101 and 102. These copper rings are riveted to insulation 103 which is secured to collector ring housing 30 as shown in FIGS. 5 and 6. Half ring plate 92 carries brushes 97, 97a and 97b and brush holders 99, 99a and 99b, and adjoins half ring plate 93. Half ring plates 92 and 93 are attached to square to round housing 70. Brush holder plate 94 is secured to half plate ring 92 by nut and bolt 96, which also retains brush mounting box 84 and holder cover 95 in position. Brushes 97, 97a and 97b are kept in contact with copper rings 100, 101 and 102, respectively by springs 98a, as illustrated in FIG. 8. Contact between brush 97 and contact plate 98b is maintained by flexible wire 98c extending from between the brush and plate 98b. Wire 98c is of sufficient length and flexibility to keep contact with the brush 97 and the plate 98b as the brush wears down.

Screw 98d is screwed into the screw-hole in brush cap 98 to contact plate 98b, through eyelet 98e which is connected with the wires 104a which pass into cable 104 and on to electric motor 17.

Mounting brackets 5 and 5a are secured to the top of electrical collector ring 30. Flat plates 89 are welded on opposite sides of thrower pipe 4 and hinged in place by pin 6 which extends through mounting brackets 5 and 5a. Tubing 90 extends between mounting brackets 5 and 5a and is hinged thereto by pin 83. Telescoping tubing 7, carrying telescoping shaft 9, is attached to and extends outward from tubing 90. Telescoping shaft 9 is pivotally attached to clamp 11f which is welded to collar 11g. Bolt 11h holds collar 11g in horizontal pivotal relation to plates 11e. Plates 11e are attached to clamp 10 which fastens over the wall of silo 1 between the door openings of the silo, and may be held in position on the silo wall by wing-nut 12 through boss 13b.

Two standards 8 and 8a are pivotally attached to telescoping tubing 7. Wing-nuts 12a extend through holes 12b and screw into bosses (not shown) on thrower pipe 4, to support thrower pipe 4 at the height desired for throwing silage through the door opening.

Figure 11:
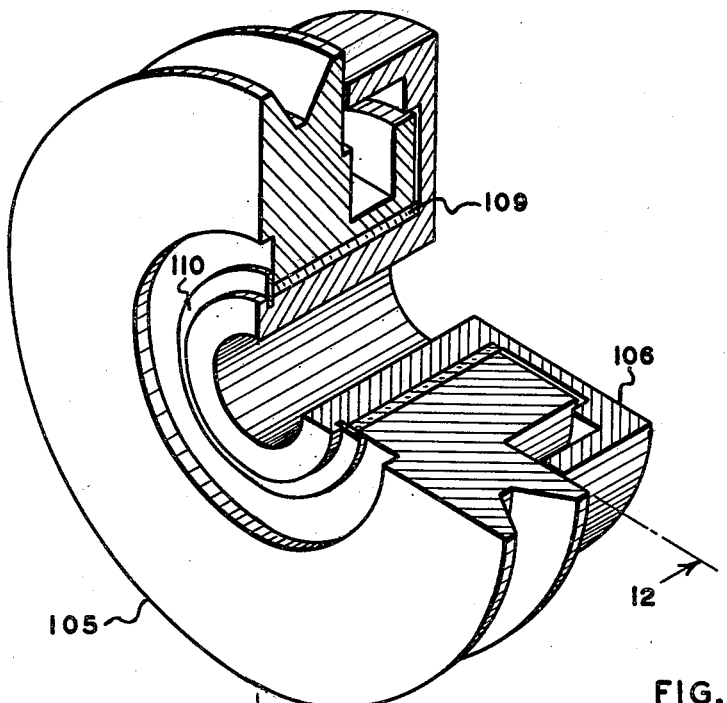
FIG. 11 is an enlarged broken away perspective view of the overriding clutch pulley and housing.
Figure 12:
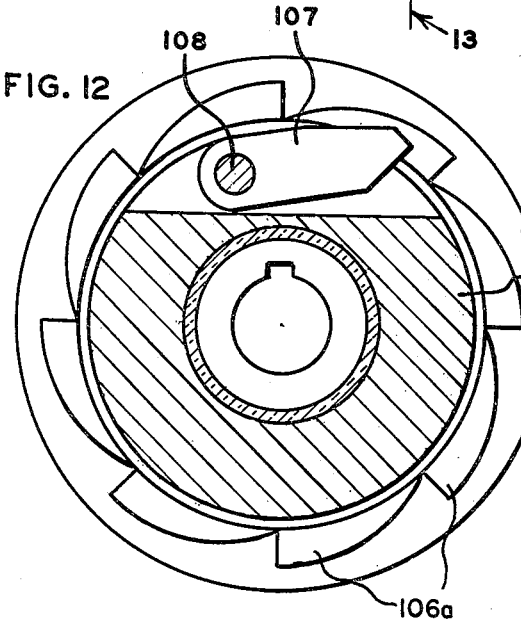
FIG. 12 is an enlarged sectional view of a portion of clutch housing on the line 12 of FIG. 11.
Figure 13:
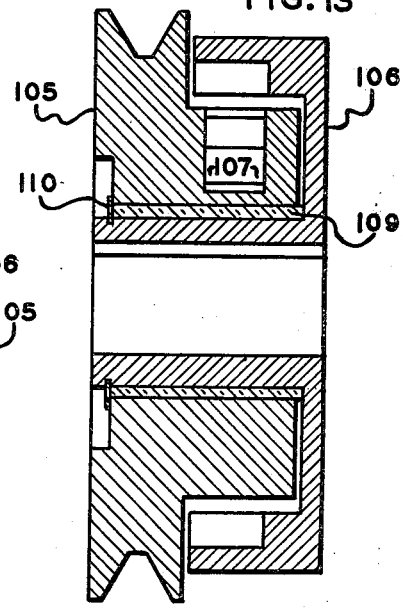
FIG. 13 is an enlarged cross-sectional view of the overriding clutch pulley and housing on the vertical line 13 of FIG. 11.

The overriding clutch pulley 105 and housing 106 is shown in FIGS. 11, 12, and 13, where a part of clutch pulley 105 is fitted within clutch housing 106. Idler bearing 109 is positioned between clutch pulley 105 and clutch housing 106 with bearing retainer washer 110 to retain clutch pulley 105 in position. Clutch housing 106 has a plurality of ratchet-like recesses or catches 106a to form a ratchet wheel. Pawl or dog 107 is pivotally secured to clutch pulley 105 by pin 108 and is positioned as shown in FIG. 12 to become seated in one of the catches 106a when clutch pulley 105 is turned in clockwise motion.

Motor 17, attached to motor tighteners 35, is secured to motor support frames 33—33a. Motor 17 carries double groove pulley 18 for two V-belts 20 and 20a. Belt 20 extends from motor pulley 18 to pulley 19 which is keyed to drive shaft 115 at gear box 2. Belt 20a extends from motor pulley 18 to overriding clutch pulley 105 at silage thrower 31.

In operation the silo unloader 1a is easily assembled within the silo 1 so that the wheels 40, 40a, 42 and 42a rest upon the top of the silage 1b. The unloader is positioned so that thrower 31 is in the approximate center of silo 1, with guidewheels 29, 29a, 29b and 29c in contact or in close proximity with silo wall 1 as shown in FIG. 1, adjustments being made as may be necessary for the size of the silo with telescoping shafts and tubing 49, 50, 49a, 50a, 47, 46, 47a and 46a respectively. Thrower pipe 4 is properly positioned for the discharge of silage through an open silo door, and may be adjusted upward and downward with wing-nuts 12a and holes 12b on supports 8 and 8a. Thrower pipe 4 is supported by telescoping tubing 7 and shaft 9 which is adjusted to the size of the silo and clamped to a portion of the silo wall 1 intervening between the silo door openings with clamp 10.

The wires 69b are connected with the usual electric switchbox in the silo room or barn. The electric current is carried to electrical connection posts 69 and to the copper rings 100, 101 and 102. The brushes 97, 97a and 97b receive the electric current from the copper rings from which the current is conveyed to the electric motor 17 through wire 98c, plate 98b, screw 98d, eyelet 98e and connecting wires 104a.

By belts 20 and 20a the motor simultaneously places in operation the thrower 31, the drive wheels 40 and 40a and the augers 15 and 16 and the connected chippers 57 and 57a. A unique feature of this invention is the ability to propel with a single gear box 2 the drive wheels 40 and 40a and the augers 15 and 16 and the chippers 57 and 57a. The belt 20 from the motor 17 to pulley 19 turns drive shaft 115. Drive shaft 115 turns shafts 112 and 113 through worms 115a and 115b and worm gears 116 and 117. Shafts 112 and 113 are connected to auger pipes 14 and 14a by universal joints 112a and 113b, which turn augers 15 and 16 and chippers 57 and 57a. As shaft 113 turns it also turns drive shaft 114 through worm 113a and worm gear 122. Driving power is furnished from drive shaft 114 to each of the driving wheels 40 and 40a, through gears 3, 3a, 3b and 3c, drive shafts 44 and 44a, universal joints 45 and 45a, tubing 46 and 46a, shafts 47 and 47a, universal joints 45b and 45c and connecting shaft.

It is of importance to have a driving wheel on each side of the auger unit, since one drive wheel pushes the end of the auger and chippers near the silo while the other drive wheel pulls the augers and chippers around within the silo. Moreover, the total weight of the outer end of the auger and chipping unit rests on the driving wheels to enable them to get good traction on the silage, and thereby minimize slippage of the drive wheels. With this driving wheel arrangement it is particularly desirable in having two augers 15 and 16 for greater capacity. By use of two augers, rather than a single auger, it is not necessary to have a cover over the augers.

The drive wheels 40 and 40a cause the augers 15 and 16, motor 17 and the structure and mechanism below collector ring housing 30 to rotate around the collector ring housing 30, pivoting on wheels 42 and 42a. Ring housing 30 with attached copper rings 100, 101 and 102, and thrower pipe 4 is stationary, while square to round housing 70 and brushes 97, 97a and 97b, rotate.

As stated, the chippers 57 and 57a which are especially useful in loosening frozen and hard-packed silage follow different paths around the edge of the silo, since they are mounted on divider 27 in an offset manner. This feature along with the fact that one of the chippers may have more blades, as shown in FIG. 4, have been found to be significant in loosening frozen and packed silage as an improved manner of feeding silage to the augers, resulting in a greater capacity. As stated, the chipper blades throw the loosened material toward the augers.

The device also has an automatic levelling device which will level off unevenness of the top of the silage and will maintain a level top surface for most efficient use of the unloader. To illustrate, where the top level of the silage is higher on one side than on the other, the outer end of the augers would tend to follow the terrain of the top of the silage without such a levelling device, thus aggravating the problem and producing an inefficient method of unloading. However, with the present invention, if the outer end of the augers start to move downward in an effort to follow the terrain of silage, the guide wheel 29 is pressed against the silo wall 1. As guide wheel 29 is pressed against the silo wall, the augers 15 and 16 and chippers 57 and 57a are raised by gussets 26 and 26a, yoke risers 28 and 28a (as secured to one end of lifters 22 and 22a), divider 27 and auger hangers 59 and 59a as gussets 26 and 26a and braces 25 and 25a pivot on bushings and bolts 22c, 22d, and 61b. Thus the augers 15 and 16 are raised over low areas and less silage carried by the augers. As the augers come in contact with the higher areas of silage the pressure on guide wheel 29 is relieved, and the silage is removed from such high areas, until the top of the silage has been leveled off. Universal joints 112a and 113b permit the outer end of augers 15 and 16 to be raised and lowered as described. When the silage is level there is no need for the automatic levelling device to come into play, and the augers carry a uniform load to the thrower as they rotate within the silo.

The augers 15 and 16 carry the silage to the thrower 31. Auger 15 has a short piece of reversed flighting 16a to direct the silage into the cutaway area of the thrower 31 shown in FIG. 2. The thrower blades 82 and brackets 81 revolve around shaft 75 at a high rate of speed, throwing the silage up into thrower pipe 4 with sufficient force to eject the silage through the open silo door. By use of an open bottom thrower as herein described the silage is brought in by the augers 15 and 16 at the same level as the thrower, so that the thrower area is always kept clean of silage.

A further improvement in the present invention is the overriding clutch shown in FIGS. 11, 12 and 13, which permits the thrower blades 82 to continue revolving after the motor 17 and augers 15 and 16 have been stopped. When the motor and augers are in operation pulley 105 revolves in a clockwise direction as illustrated in FIG. 12. Dog 107 falls into a catch 106a and the clutch housing 106 turns with pulley 105. However, when the motor is stopped and pulley 105 stops revolving, clutch housing 106 and connected thrower shaft 75, carrying thrower blades 82, continue to revolve as dog 107 drops out of catch 106a. The thrower blades thus throw out of the silo any accumulation of silage, and the thrower is clean and ready for the next operation without any manual forking or cleaning. By having the thrower area clean of silage, it is easy to start the thrower for the next operation and there is no danger of frozen silage clogging or breaking the thrower blades.

Although various speeds will work satisfactorily, the inventor has had especially good results when the drive shaft 115 rotates at about 1725 r.p.m., the auger drive shafts 112 and 113 at about 170 r.p.m., drive shaft 114 at about 3 r.p.m., and thrower shaft at about 1450 r.p.m.

The modification shown in FIGS. 21–24 has been found particularly useful when the silage is frozen or packed into a very hard mass. By placing a plurality of chippers 57a, 57b and 57c shown in FIG. 23 over one of the auger shafts 14 to replace a portion of the auger 15 shown in FIG. 22, the hardened silage is easily loosened and carried to the thrower. The section of auger flighting 15 in FIG. 22 is secured to tubing 127 which slides over auger pipe 14 and is secured thereto by bolts through holes 129, 129a, 129b and 129c. By removing the bolts the section of auger flighting may be removed from auger pipe 14. The section of chippers 57b, 57c and 57d, secured to tubing 130 by discs 131, 131a and 131b may be placed over auger pipe 14 and secured by bolts through holes 129, 129b, 129d and 129e. Chipper shaft 132 is welded to auger tubing 14 and carries the end chipper 57a shown in FIG. 4.

As a further means for loosening and cutting frozen and hard packed silage auger knives 126 may be mounted on auger flighting 15 and 16 with stove bolts 133 and 133a or other suitable means as desired.

It is to be understood that the present invention is not confined to the particular construction and arrangement of parts herein illustrated and described, but embraces all such modified forms thereof as may come within the scope of the following claims.

I claim:

1. In non-suspending apparatus for unloading materials from silos and the like having a substantially circular inside wall and augers attached to a frame supported by drive wheels bearing on said materials and extending toward the center of the silo from near the inner wall thereof which augers revolve over the surface of the materials and gather layers of said materials to a central discharge system for ejection from said silo, a device for automatically maintaining the level of the remaining materials in said silo in a substantially horizontal plane comprising, means for attaching said augers to said frame in vertically swingable relation thereto, an upper guide wheel substantially horizontally positioned to be in contact with the inside wall of the silo, lower guide wheels for locating said frame and said upper guide wheel with respect to the inside wall of said silo, auger hangers secured to said augers near the said inside wall, braces extending from said upper guide wheel pivotally connected with said frame and with linkage secured to said hangers to raise said augers with respect to said frame as the level of the materials near said inside wall drops with respect to the level of the materials near the center of said silo and the pressure of the upper guide wheel against the inside wall of said silo is increased, and to lower said augers with respect to said frame as the level of the materials near said inside wall raises with respect to the level of the materials near the center of said silo and the pressure of the upper guide wheel against the inside wall of said silo is decreased.

2. The device of claim 1 wherein the said guide wheel is slightly tilted to facilitate the travel upward of said guide wheel on the inside wall of the silo as the pressure of the guide wheel against the inside wall of said silo is increased.

3. In apparatus for unloading material from silos and the like having augers which, when powered by a motor, revolve over the surface of the material and gather said material to a central discharge thrower with a shaft carrying thrower blades powered by the same motor by belt means for ejection of the material from the silo, an overriding clutch for emptying said central discharge system after the said motor is de-energized, comprising, a pulley having a separable hub attached to said thrower shaft, means for retaining said separable hub within the pulley, circular ratchet means within said pulley and a pawl carried by said separable hub whereby the said pawl engages in said ratchet means when said motor is energized to rotate said thrower and the pawl is disengaged from said ratchet means when said motor is de-energized to allow said thrower to continue to rotate.

4. A non-suspending device for removing material from a silo and the like having substantially circular inside walls with a discharge opening at one side thereof comprising, a frame having an inner end extending toward the central portion of said silo and an outer end in proximity with the inside wall of the silo, means for preventing the outer end of said frame from being in contact with said inside wall, a plurality of augers secured to said frame for bringing said material toward the inner end of said frame, driving wheels on each side of said frame for moving the outer end of said frame in a line of travel following the inside wall of the silo, said driving wheels being in proximity with the outer end of said frame and supporting a substantial share of the weight of said outer end and the attachments thereto, idler wheels on each side of said frame in proximity with the inner end of said frame and supporting a substantial share of the weight of said inner end and the attachments thereto, means for adjusting said driving wheels and idler wheels upwardly and downwardly in relation to said augers and for directional adjustment of said wheels, thrower means secured to said frame near the inner end thereof in direct communication with the augers, discharge means pivotally secured to and in direct communication with said thrower means through which to eject said material directly through the discharge opening of said silo, means for retaining said discharge means in continuous open relationship with said discharge opening in said silo, motor and gear means for operating said augers, driving wheels and thrower means.

5. In silo unloading apparatus having a silage thrower connected to the lower end of a thrower pipe by a mounting bracket for ejecting ensilage through the open silo doors extending vertically along a side of the silo with horizontal partitions between said doors, a thrower pipe support comprising, a telescoping tubing pivotally secured at one end to said mounting bracket by a horizontally disposed pin and having a telescoping shaft extending outwardly from the other end thereof, the outward end of said shaft being pivotally secured for vertical movement to a clamp, said clamp being secured to a collar, the collar being pivotally secured for horizontal movement to means for rigid attachment to the horizontal partitions between said silo doors, support means for the upper portion of said thrower pipe extending between said telescoping tubing and said thrower pipe.

6. In apparatus for unloading materials from silos and the like having a substantially circular inside wall and a frame extending toward the center of the silo from near the inner wall thereof with leading and following augers attached to said frame and revolving over the circular surface of the materials to gather layers of said materials to a central discharge system, reversed flighting located on one of said augers near the center of said silo for directing said material to said central discharge system, said reversed flighting being connected to the normal flighting of said auger to prevent said materials from passing between said normal and reversed flighting.

7. The invention described in claim 6 wherein the augers rotate in opposite directions and wherein the following auger has the reversed flighting to prevent said materials from being pushed beyond said thrower to accumulate in a pile at said silo center.

8. The device of claim 1 wherein the augers are rotated by gear means attached to said frame, and wherein universal joints connect said augers and said gear means.

References Cited in the file of this patent

UNITED STATES PATENTS

| | | |
|---|---|---|
| 2,355,244 | Scholl | Aug. 8, 1944 |
| 2,641,137 | Orcutt et al. | June 9, 1953 |
| 2,719,058 | Van Dusen | Sept. 27, 1955 |
| 2,794,560 | Buschbom | June 4, 1957 |
| 2,995,260 | McCann et al. | Aug. 8, 1961 |

FOREIGN PATENTS

| | | |
|---|---|---|
| 365,727 | France | Sept. 15, 1906 |